United States Patent
Ho (10) Patent No.: US 7,602,139 B2
(45) Date of Patent: Oct. 13, 2009

(54) SIGNAL CONDITIONING APPARATUS AND METHOD FOR DETERMINATION OF PERMANENT MAGNET MOTOR ROTOR POSITION (75) Inventor: Eddy Ying Yin Ho, Torrance, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 11/776,943

(22) Filed: Jul. 12, 2007

(65) Prior Publication Data
US 2008/0048599 A1 Feb. 28, 2008

Related U.S. Application Data

(60) Provisional application No. 60/807,241, filed on Jul. 13, 2006.

(51) Int. Cl.
H02P 21/00 (2006.01)
(52) U.S. Cl. .................. 318/806; 318/400.02
(58) Field of Classification Search .......... 318/806, 318/400.02
See application file for complete search history.

(56) References Cited
U.S. PATENT DOCUMENTS 5,144,564 A * 9/1992 Naidu et al. ............. 318/721
5,565,752 A * 10/1996 Jansen et al. ............. 318/807
5,585,709 A * 12/1996 Jansen et al. ............. 318/807
6,069,467 A * 5/2000 Jansen ...................... 318/802
6,137,258 A * 10/2000 Jansen ...................... 318/802
7,045,988 B2 * 5/2006 Ha et al. ................... 318/807
7,064,504 B2 * 6/2006 Imai et al. ............. 318/400.04
2005/0248306 A1 * 11/2005 Chen et al. ............... 318/712

* cited by examiner

Primary Examiner—Rina I Duda
Assistant Examiner—Erick Glass
(74) Attorney, Agent, or Firm—Farjami & Farjami LLP (57) ABSTRACT

An apparatus and method for estimating rotor angle information for the control of permanent magnet AC motors having sinusoidal current excitation. The disclosed motor drive can provide full load operation at very low speeds including zero speed without the use of a shaft position sensing device. The rotor angle is estimated through injection of high frequency current, and rotor angle is extracted by a signal-conditioning algorithm, which utilizes current amplitude differential to discriminate the rotor angle. Rotor angle magnetic axis orientation (North or South pole) at startup is detected by comparing time average current ripple (at signal injection frequency) content between two different levels of d-axis current injection.

28 Claims, 8 Drawing Sheets

FIG. 1

NOTATION OF ANGLE (RtrAng)

FIG.2a

CURRENT AMPLITUDE VERSUS ROTOR
ANGLE (RtrAng) 4-POLE MOTOR

FIG.2b

CURRENT AMPLITUDE DIFFERENCE AND COMPUTED SIGNALS
VERSUS ROTOR ANGLE (RtrAng)

MAGNET ALIGNMENT (N) IN-PHASE

FIG.4a

MAGNET ALIGNMENT (S) OUT-OF-PHASE

SIGNAL CONDITIONING APPARATUS AND METHOD FOR DETERMINATION OF PERMANENT MAGNET MOTOR ROTOR POSITION

CROSS-REFERENCE TO RELATED APPLICATIONS

This application is based upon and claims priority of U.S. Provisional Ser. No. 60/807,241 filed Jul. 13, 2006, by Eddy Ying Yin HO, titled SIGNAL CONDITIONING APPARATUS FOR DETERMINATION OF PERMANENT MAGNET MOTOR ROTOR POSITION (IR-3239 PROV (2-5260)), incorporated by reference.

BACKGROUND OF THE INVENTION

1. Field of the Invention

The present invention relates to a signal conditioning apparatus and method for determination of permanent magnet motor rotor position.

2. Related Art

Rotor position information is in general required for stable operation of permanent magnet AC motors. Continuous rotor position can be obtained from an encoder mounted on a motor shaft or obtained indirectly through estimation algorithms (based on voltage and current feedbacks). The latter is preferred for lower system and operating cost.

Back EMF-based sensorless control methods cannot sustain low and zero speed operations. Applications such as electric vehicles, power steering, electric scooter and traction systems all require full torque control down to zero speed. Signal injection techniques have been suggested to enable continuous low speed operation of a permanent magnet motor. By injection of high frequency (typically 0.5 to 2 KHz) current into the motor, the rotor position can be extracted from the negative sequence component of the injected high frequency current. The negative sequence component contains information on the rotor magnetic axis. However, the magnetic axis polarity (North or South) information is not present in the negative sequence component. Therefore, the magnetic axis polarity has to be computed by extra means before drive torque application.

Signal injection methods have been proposed which utilize complex synchronously rotating frame filters to extract rotor magnetic axis information from the negative sequence current component. It would be desirable to provide a simplified technique to extract rotor position information from a negative sequence current component.

SUMMARY OF THE INVENTION

Accordingly, the disclosed embodiment of the invention provides a method and system including a simple signal conditioning unit and method to extract rotor angle information from motor current feedback. The embodiment is further extended to include a rotor angle magnetic axis identifier, which provides proper rotor angle phasing (0 or 180 degree) before drive startup.

The disclosed embodiment of the invention provides a simple signal conditioning technique to extract rotor position information from the negative sequence component. In particular, the embodiment provides fast rotor angle tracking without the use of synchronously rotating frame filters. The embodiment is further extended to include magnetic axis polarity identification at drive startup. This identification employs comparison of the time integral of ripple current error (abs(IdErr)+abs(IqErr)) under two different levels of d-axis current injection.

Ripple current is the current component of the high frequency signal injection. The increase of ripple current or time average of ripple current is due to induced magnetic saturation. This induced saturation occurs when the d-axis dc current (IdStart) is applied (during magnetic polarity determination) such that the flux introduced by this d-axis current tends to increase the resultant flux (rotor magnet flux and d-axis current induced flux).

According to an aspect of the invention, a method and a system for practising the method, for estimating rotor angle for controlling a permanent magnet AC motor having sinusoidal current excitation, may comprise in combination:

a first unit supplying a high-frequency current signal to said motor; and a second unit extracting estimated rotor angle information from a current feedback signal from said motor.

The first unit advantageously supplies sine and cosine signals to said motor.

The second unit advantageously measures amplitudes of three component signals u, v and w in said current feedback signal from said motor, computes a pair of calculated signals, and extracts said rotor angle information from said pair of calculated signals.

One calculated signal may be a difference signal between two of said components, and the other calculated signal may be $((u+v-2w)/\sqrt{3})$.

The difference signal may be $(u-v)$.

The rotor angle information is advantageously extracted from said pair of calculated signals by a PLL.

According to another aspect of the invention, together with or separate from the first method and system discussed above, a third unit may be provided for detecting a rotor magnetic axis polarity based on said current feedback signal from said motor;

wherein said third unit injects a d-axis DC current to said motor at a first level and a second level, measures first and second time average ripple currents in said current feedback signal when said d-axis current is at said first level and at said second level, and determines said magnetic polarity from said first and second time average ripple currents.

Advantageously, said first level is lower than said second level; said polarity is determined to be positive when said second time average ripple current is higher than said first time average ripple current; and said polarity is determined to be negative when said second time average ripple current is lower than or equal to said first time average ripple current.

Advantageously, said third unit determines said first and second time average ripple currents, respectively, by integrating respective absolute error signals based on said current feedback signal over a prescribed period of time, while said injected d-axis current is at said first level, and while said injected d-axis current is at said second level.

The first level may be zero.

Advantageously, when said third unit determines said magnetic polarity to be negative, said third unit applies a 180 degree phase shift to said estimated rotor angle generated by said second unit.

Other features and advantages of the present invention will become apparent from the following description of the invention which refers to the accompanying drawings.

BRIEF DESCRIPTION OF THE DRAWINGS

FIG. 3b is a block diagram of a PLL which is usable in the circuit of FIG. 3a.

DETAILED DESCRIPTION OF AN EMBODIMENT OF THE INVENTION

The present invention relates to a motor control technique. The technique may advantageously be implemented in firmware, but the invention is not limited to the disclosed implementation.

Figure 1:
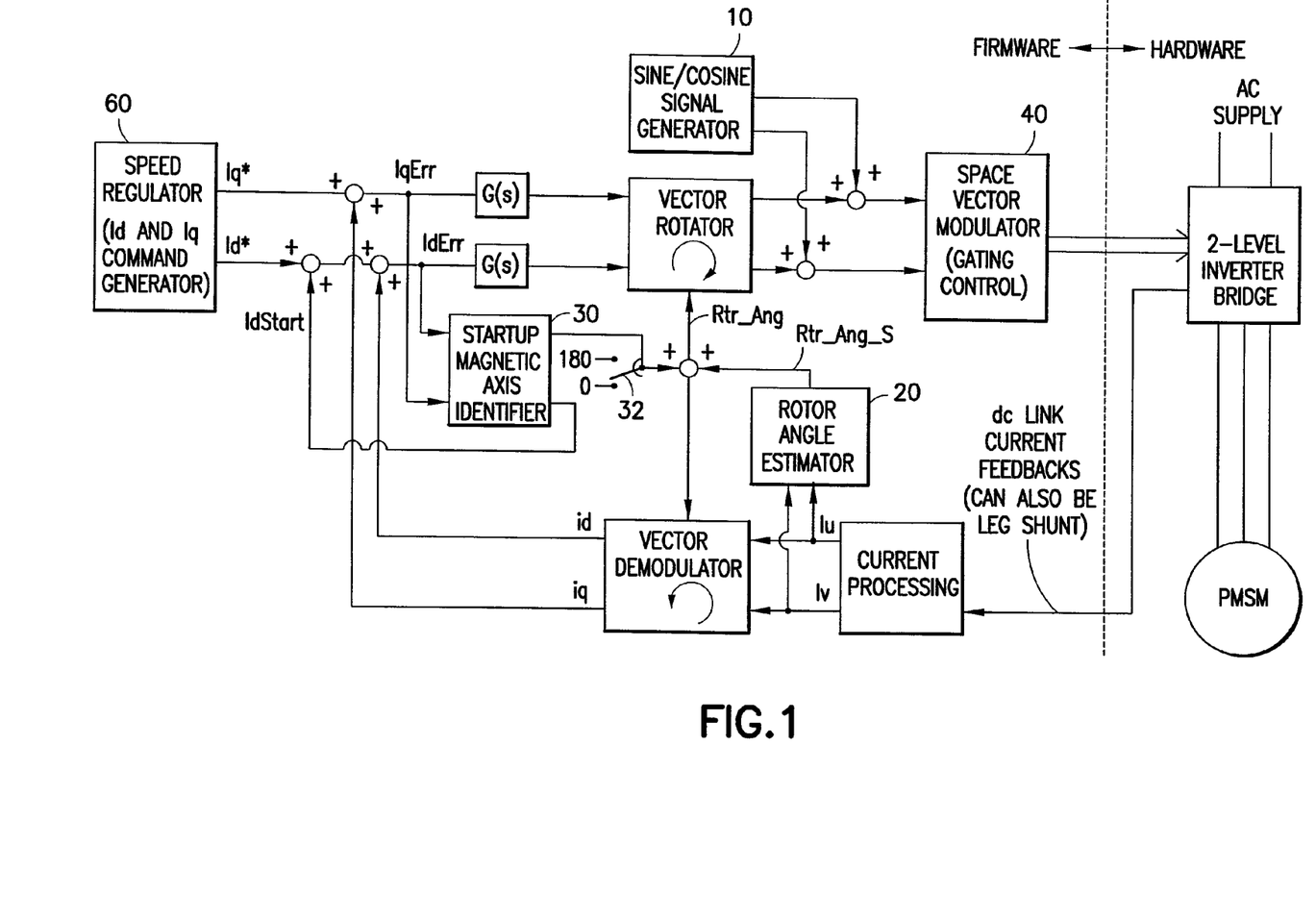
FIG. 1 is a block diagram showing a PMSM (permanent magnet synchronous motor) control technique with rotor angle estimation.

A block diagram of the control technique is shown in FIG. 1. The d-axis is the orientation that aligns with the magnetic axis of the rotor (which is the convention in most published articles). The shaded boxes (sine/cosine signal generator 10, signal conditioning unit for rotor magnetic axis angle estimation 20, startup magnetic axis polarity identifier 30) are the major components of rotor angle estimation. The sine/cosine signal generator 10 outputs high frequency sine and cosine signals that are superimposed into the input of the space vector modulator 40. This in effect imposes a high frequency component on the current waveform. The signal-conditioning unit 20 extracts rotor magnetic axis information from the feedback currents (Iu and Iv). The signal conditioning unit tracks magnetic axis. The polarity of the axis is handled by the magnetic axis polarity identifier 30, which determines whether an offset of 180 Deg phase shift is required for the rotor magnetic axis angle (Rtr_Ang_S).

DEFINITIONS

Figure 2A:
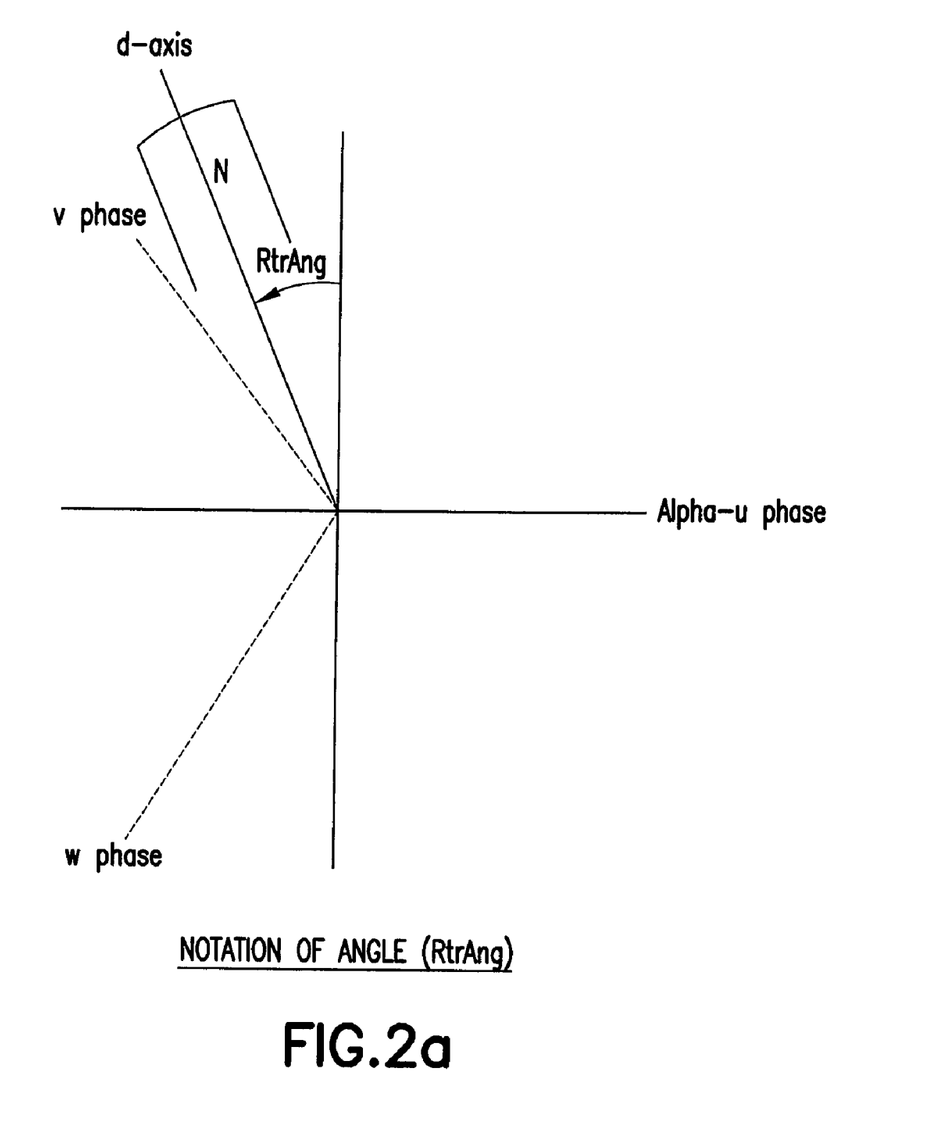
FIGS. 2a and 2b are graphs showing relationships of current amplitude and rotor angle.
Figure 2B:
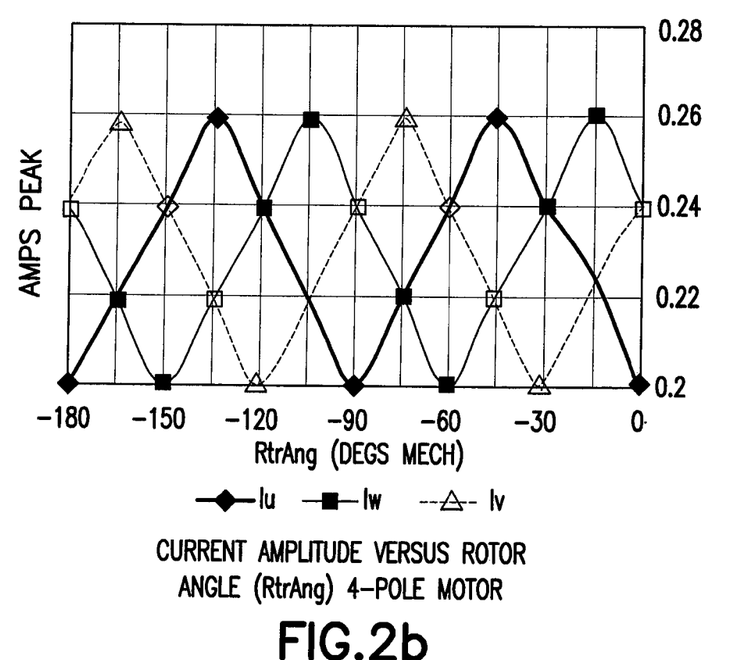

- id*—flux current command
- iq*—torque current command
- id—flux current feedback
- iq—torque current feedback
- iu, iv—phase currents
- Rtr_Ang—estimated rotor angle
- Rtr_Ang_S—estimated rotor magnetic axis
- IdStart—d-axis current bias
- IqErr, idErr—q and d-axis current error FIGS. 2a and 2b show the relationship of motor current amplitude (3 phases u-v-w) versus rotor mechanical angle (RtrAng) position for a 4-pole permanent magnet motor under high frequency (500 Hz) voltage application with the motor at standstill. By inspection of the high frequency (500 Hz) current amplitude versus rotor angle relationship (FIG. 2b), a dc offset and a near-sinusoidal relationship are seen in all three of the current amplitude measurements (FIG. 2b). The current amplitude maximum point repeats two times within a 180 degree mechanical rotation for this 4-pole motor. The rotor magnetic axis information is embedded in these current amplitudes. In order to extract the information, the measured current amplitudes (for instance: u–v) are subtracted from each other. The dc offset and certain harmonic components which are inherent in the u, v, and w current amplitudes (FIG. 2b) are eliminated due to this subtraction.

Figure 2C:
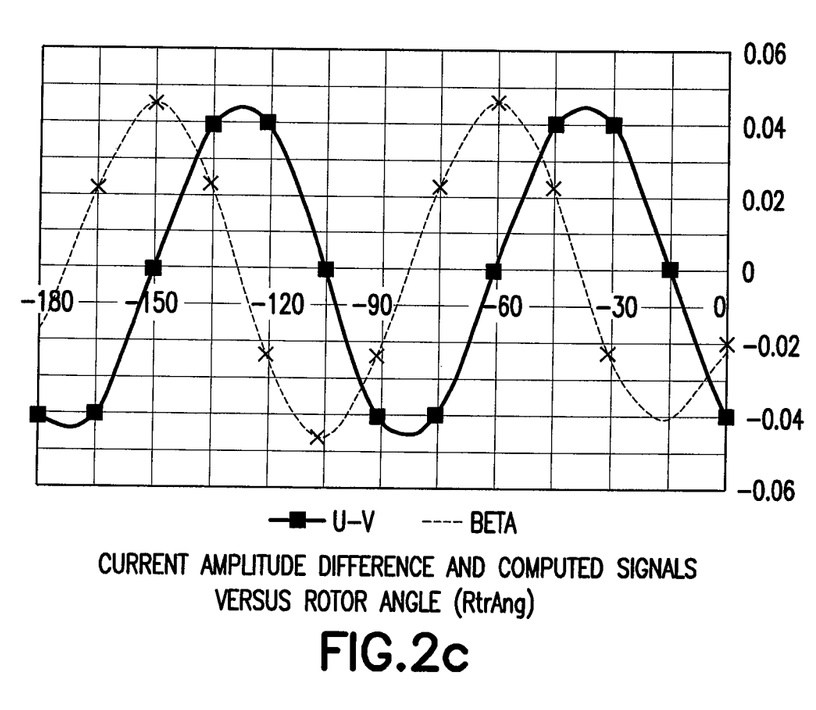
FIG. 2c is a graph showing two computed signals based on current amplitude that are used in the technique.

A new signal Beta (FIG. 2c) is introduced to pair with the newly formed difference signal (u–v). This new signal is orthogonal to the difference signal (u–v) and is computed as ((u+v−2w)/sqrt(3)) based only on the amplitude of u, v and w current amplitude. FIG. 2c shows the relationship of rotor angle and the pair of newly formed ((u–v) and (u+v−2w)/sqrt(3)) signals. By utilizing this pair of signals, the rotor magnetic axis can be extracted by using an ArcTan function, or a Phase Lock Loop (PLL) module 50 in this embodiment, as seen in FIG. 3b.

Figure 3A:
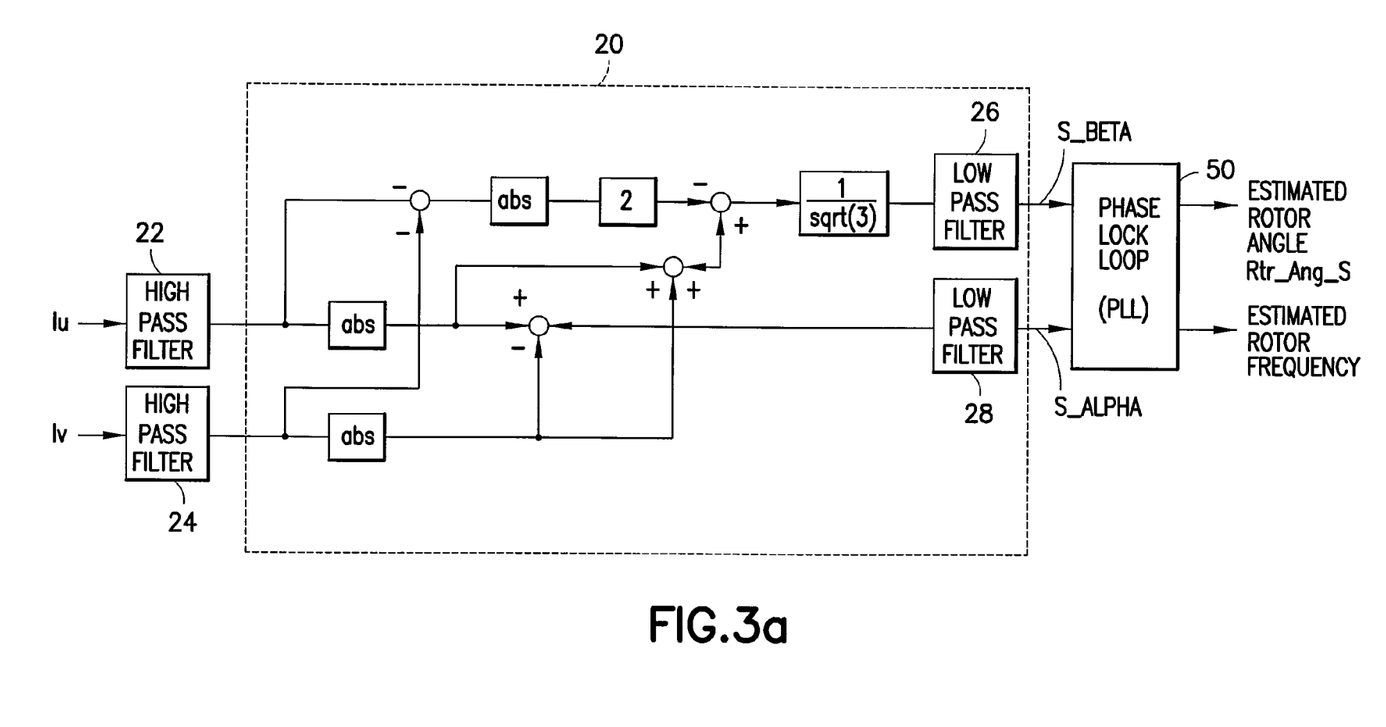
FIG. 3a is a block diagram showing a signal conditioning technique for rotor angle estimation.
Figure 3B:
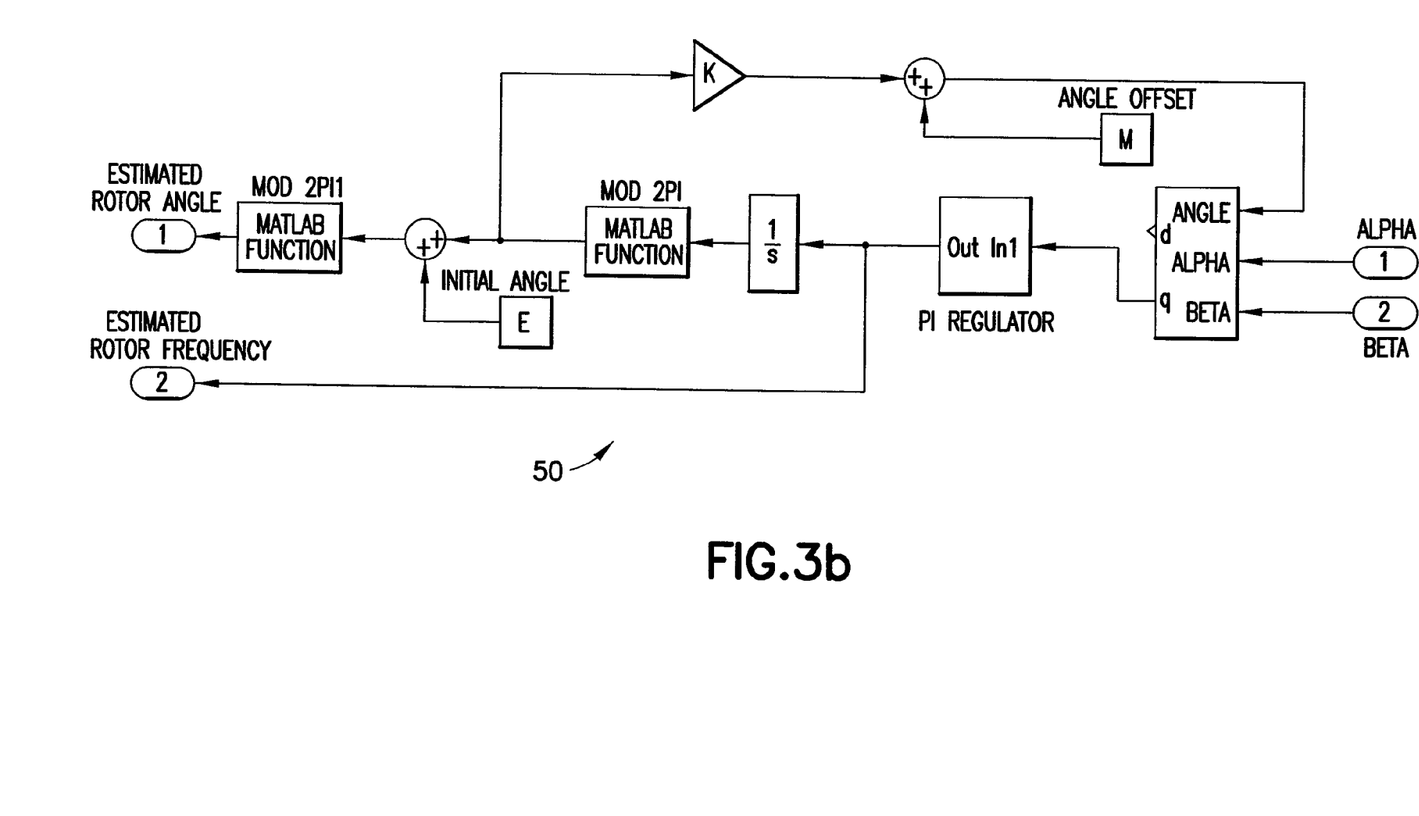

FIG. 3a shows an implementation of a signal-conditioning unit for rotor magnetic axis extraction 20. The pair of signals (S_Beta and S_Alpha) that are used for rotor magnetic axis extraction are shown in FIG. 3. Signal amplitude is computed by taking absolute value on high frequency current component, and low pass filters 26, 28 obtain the mean average of the amplitude. In the input stage of the signal-conditioning unit 20, high pass filters 22, 24 are used to remove fundamental components generated by motor load. The output of the high pass filters contains high frequency components in which the rotor magnetic axis information is embedded. This information is extracted using a calculation of (u–v) and (u+v−2w)/sqrt(3) as shown in FIG. 3a. The phase shift introduced by the low pass filters is normally insignificant at low and zero speeds. If desired, this phase shift can be compensated for inside the PLL unit 50, shown in FIG. 3b.

The signal-conditioning unit 20 determines rotor magnetic axis. However, for the absolute rotor angle, the magnet polarity (0 or 180 electrical deg phase shift) is determined before application of torque. FIG. 1 shows the block diagram including the magnetic axis polarity identifier 30. In FIG. 1, d-axis DC current is supplied by the command generator 60. In addition, the polarity identifier 30 injects an additional d-axis DC current IdStart (FIG. 1). This DC injection is along the magnetic axis and will not contribute to motor torque production or shaft movement. By comparing the amounts of time average current ripple (high frequency injection) between zero d-axis current and a positive d-axis value (IdStart), the magnetic polarity can be determined.

Motor resultant flux is composed of fluxes contributed by rotor magnet and d-axis current. If these two components are in phase, it will push the motor into deeper saturation and hence introduce higher time average current ripple. Under such condition, there is no need to correct magnetic phasing. However, if the time average current ripple becomes smaller or unchanged upon positive d-axis current application, the rotor magnet flux opposes the flux component generated by the d-axis current. In this case, the motor resultant flux and time average current ripple will reduce. A 180 degree offset phasing will be applied (FIG. 1).

Figure 4A:
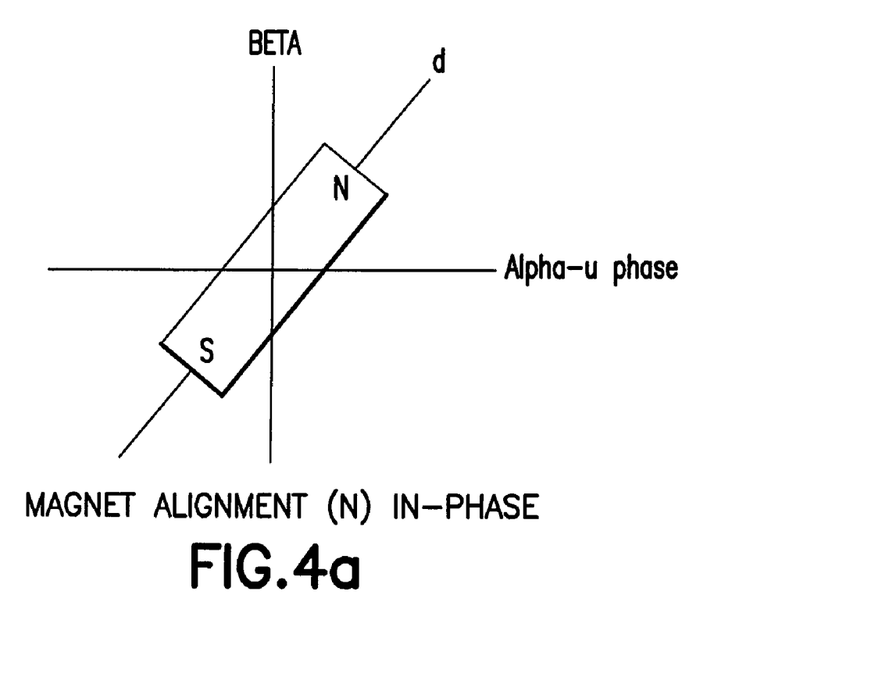
FIGS. 4a and 4b are diagrams showing an in-phase rotor alignment condition and time average current ripple signals under that condition.
Figure 4B:
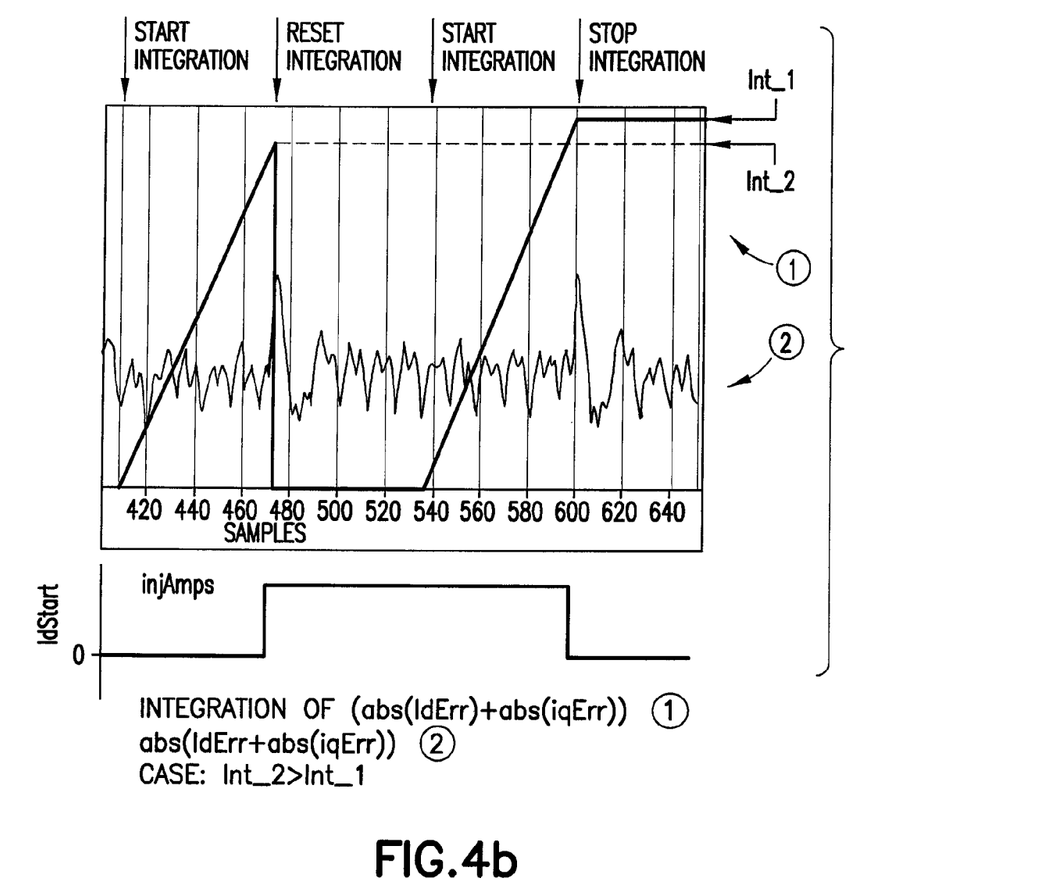

The amount of time average ripple current is computed by integrating absolute current errors IdErr and IqErr (FIG. 1) for prescribed time duration. This process is shown in FIG. 4 for the case where rotor magnet flux is in phase with the flux induced by a positive d-axis current. As can be seen from this figure, integration results Int_2 (with IdStart=positive) is larger than Int_1 (with IdStart=0) indicating time average higher current ripple when a positive d-axis current is applied.

Figure 5A:
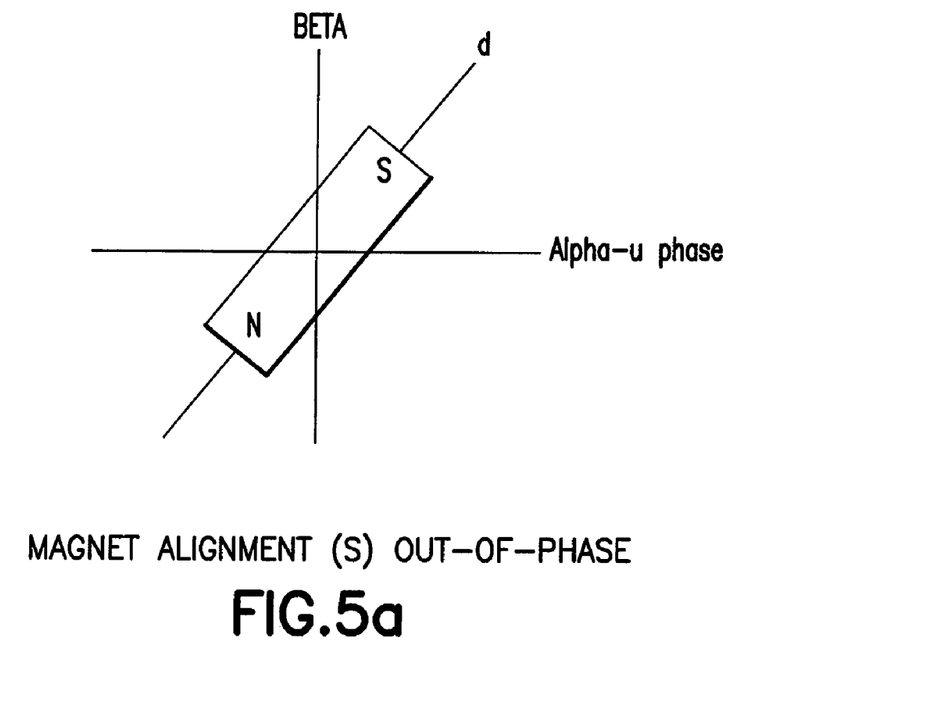
FIGS. 5a and 5b are diagrams showing an out-of-phase rotor alignment condition and time average current ripple signals under that condition.
Figure 5B:
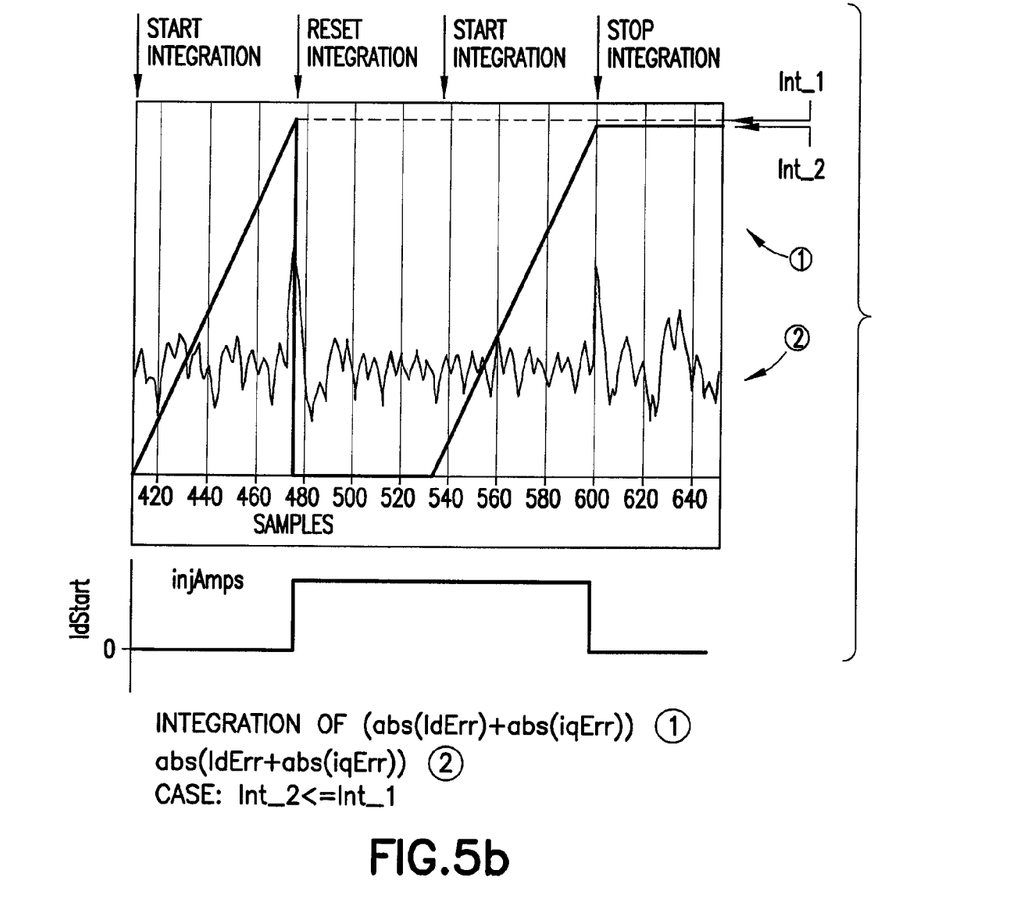

FIG. 5 shows the case where rotor magnet flux is out of phase with the d-axis current induced flux. In this case, Int_2 is less than or equal to Int_1, indicating less time average current ripple and an out-of-phase condition.

Although the present invention has been described in relation to particular embodiments thereof, many other variations and modifications and other uses will become apparent to those skilled in the art. Therefore, the present invention is not limited by the specific disclosure herein.

What is claimed is:

1. A system for estimating rotor angle for controlling a permanent magnet AC motor having sinusoidal current excitation, comprising in combination:
    a first unit for supplying a high-frequency current signal to said motor; and
    a second unit for extracting estimated rotor angle information from a current feedback signal from said motor;
    wherein said first unit supplies sine and cosine signals to said motor; and
    wherein said second unit measures amplitudes of three component signals u, v and w in said current feedback signal from said motor, computes a pair of calculated signals, and extracts said rotor angle information from said pair of calculated signals,
    further comprising a third unit for detecting a rotor magnetic axis polarity based on said current feedback signal from said motor;
    wherein said third unit injects a d-axis DC current to said motor at a first level and a second level, measures first and second time average ripple currents in said current feedback signal when said d-axis current is at said first level and at said second level, and determines said magnetic polarity from said first and second time average ripple currents.

2. The system of claim 1, wherein one calculated signal is a difference signal between two of said components, and the other calculated signal is ((u+v−2w)/sqrt(3)).

3. The system of claim 2, wherein said difference signal is (u−v).

4. The system of claim 1, wherein said rotor angle information is extracted from said pair of calculated signals by a PLL.

5. The system of claim 1, wherein said first level is lower than said second level; said polarity is determined to be positive when said second time average ripple current is higher than said first time average ripple current; and said polarity is determined to be negative when said second time average ripple current is lower than or equal to said first time average ripple current.

6. The system of claim 1, wherein said third unit determines said first and second time average ripple currents, respectively, by integrating absolute error signals based on said current feedback signal over a prescribed period of time, while said injected d-axis current is at said first level, and while said injected d-axis current is at said second level.

7. The system of claim 1, wherein said first level is zero.

8. The system of claim 1, wherein, when said third unit determines said magnetic polarity to be negative, said third unit applies a 180 degree phase shift to said estimated rotor angle generated by said second unit.

9. A system for estimating rotor angle for controlling a permanent magnet AC motor having sinusoidal current excitation, comprising:
    a polarity detecting unit for detecting a rotor magnetic axis polarity based on a current feedback signal from said motor;
    wherein said polarity detecting unit injects a d-axis DC current to said motor at a first level and a second level, measures first and second time average ripple currents in said current feedback signal when said d-axis current is at said first level and at said second level, and determines said magnetic polarity from said first and second time average ripple currents.

10. The system of claim 9, wherein said first level is lower than said second level; said polarity is determined to be positive when said second time average ripple current is higher than said first time average ripple current; and said polarity is determined to be negative when said second time average ripple current is lower than or equal to said first time average ripple current.

11. The system of claim 9, wherein said polarity detecting unit determines said first and second time average ripple currents, respectively, by integrating absolute error signals based on said current feedback signal over a prescribed period of time, while said injected d-axis current is at said first level, and while said injected d-axis current is at said second level.

12. The system of claim 9, wherein said first level is zero.

13. The system of claim 9, further comprising a second unit for extracting estimated rotor angle information from said current feedback signal from said motor; and
    wherein, when said polarity detecting unit determines said magnetic polarity to be negative, said polarity detecting unit applies a 180 degree phase shift to said estimated rotor angle generated by said second unit.

14. The system of claim 6 or claim 11, wherein said time average ripple currents are determined by the integration of (abs(IqErr)+abs(IdErr)).

15. A method of estimating rotor angle for controlling a permanent magnet AC motor having sinusoidal current excitation, comprising the steps of:
    supplying a high-frequency current signal to said motor; further comprising the step of supplying sine and cosine signals to said motor; and
    extracting estimated rotor angle information from a current feedback signal from said motor; further comprising the steps of measuring amplitudes of three component signals u, v and w in said current feedback signal from said motor, computing a pair of calculated signals, and extracting said rotor angle information from said pair of calculated signals,
    further comprising the step of detecting a rotor magnetic axis polarity based on said current feedback signal from said motor; and
    further comprising the steps of injecting a d-axis DC current to said motor at a first level and a second level, measuring first and second time average ripple currents in said current feedback signal when said d-axis current is at said first level and at said second level, and determining said magnetic polarity from said first and second time average ripple currents.

16. The method of claim 15, wherein one calculated signal is a difference signal between two of said components, and the other calculated signal is ((u+v−2w)/sqrt(3)).

17. The method of claim 16, wherein said difference signal is (u−v).

18. The method of claim 15, further comprising the step of using a PLL to extract said rotor angle information from said pair of calculated signals.

19. The method of claim 15, wherein said first level is lower than said second level; said polarity is determined to be positive when said second time average ripple current is higher than said first time average ripple current; and said polarity is determined to be negative when said second time average ripple current is lower than or equal to said first time average ripple current.

20. The method of claim 15, further comprising the steps of determining said first and second time average ripple currents, respectively, by integrating absolute errors signal based on said current feedback signal over a prescribed period of time, while said injected d-axis current is at said first level, and while said injected d-axis current is at said second level.

21. The method of claim 15, wherein said first level is zero.

22. The method of claim 15, further comprising the step of, when said magnetic polarity is determined to be negative, applying a 180 degree phase shift to said estimated rotor angle generated by said second unit.

23. A method for estimating rotor angle for controlling a permanent magnet AC motor having sinusoidal current excitation, comprising the steps of:
 detecting a rotor magnetic axis polarity based on a current feedback signal from said motor;
 further comprising the steps of injecting a d-axis DC current to said motor at a first level and a second level, measuring first and second time average ripple currents in said current feedback signal when said d-axis current is at said first level and at said second level, and determining said magnetic polarity from said first and second time average ripple currents.

24. The method of claim 23, wherein said first level is lower than said second level; said polarity is determined to be positive when said second time average ripple current is higher than said first time average ripple current; and said polarity is determined to be negative when said second time average ripple current is lower than or equal to said first time average ripple current.

25. The method of claim 23, further comprising the steps of determining said first and second time average ripple currents, respectively, by integrating absolute error signals based on said current feedback signal over a prescribed period of time, while said injected d-axis current is at said first level, and while said injected d-axis current is at said second level.

26. The method of claim 23, wherein said first level is zero.

27. The method of claim 23, further comprising the steps of extracting estimated rotor angle information from said current feedback signal from said motor; and, when said magnetic polarity is determined to be negative, applying a 180 degree phase shift to said estimated rotor angle.

28. The method of claim 20 or claim 25, wherein said time average ripple currents are determined by the integration of (abs(IqErr)+abs(IdErr)).

* * * * *